Figure 1:
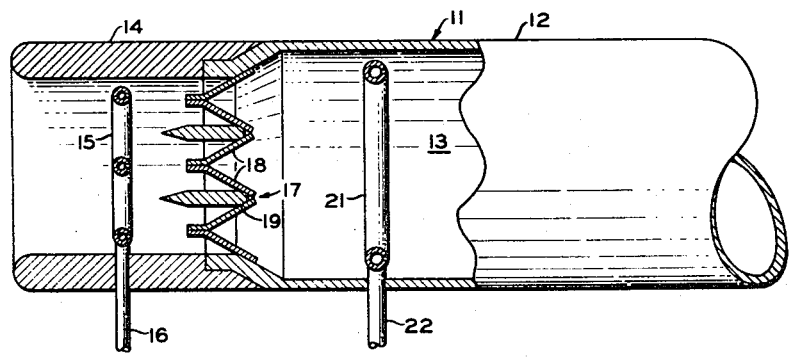

Aug. 7, 1951     S. C. BRITTON ET AL     2,563,305

COATING OF PULSE-JET VALVE ELEMENTS

Filed July 29, 1948

INVENTORS
S. C. BRITTON
R. M. SCHIRMER

BY *Hudson and Young*

ATTORNEYS

Patented Aug. 7, 1951

2,563,305

UNITED STATES PATENT OFFICE 2,563,305

COATING OF PULSE-JET VALVE ELEMENTS

Sylvester C. Britton and Robert M. Schirmer, Bartlesville, Okla., assignors to Phillips Petroleum Company, a corporation of Delaware Application July 29, 1948, Serial No. 41,414

14 Claims. (Cl. 60—35.6)

This invention relates to jet engine fuel. In one of its more specific aspects it relates to improved pulse jet engine fuel. In another of its more specific aspects it relates to a method for operating pulse jet engines.

This is a continuation-in-part of our United States patent application Serial Number 352, filed January 2, 1948.

A pulse jet engine is an intermittent, compressorless, aerodynamic power plant. The engine is composed of a shaped tube fitted with one-way flow check valves at the forward end. Unlike typical reciprocating internal combustion engines the problem of knocking is not one of the difficulties of operation. In Diesel engines, which are classified as compression ignition engines, the difficulty of attaining constant pressure heat addition presents a problem of high importance. The problem presented in the operation of the pulse jet engine is, however, diametrically opposite. It is desirable in the operation of a pulse jet engine to attain the most rapid possible pressure rise. It is thus desirable to provide a fuel for a pulse jet engine which will have the shortest possible burning time, the greatest combustion heat output, and one which will produce the greatest forward thrust.

The pulse jet engine comprises few or none of the mechanical features of stationary power plants. The engine is, as above stated, composed of a shaped tube fitted with one-way check valves at the forward end. Some conventional valves comprise thin sheets of spring metal which are attached so as to close on metal seats. The tube is so constructed that air flows successively through an entrance venturi, past the flow check valves and a valve blade shield into a cylindrical combustion zone of fixed size. The engine is started by forcing air through a mixing zone where fuel and air are mixed. The fuel-air mixture is then introduced into a primary combustion zone. Initial ignition for the fuel is provided by a spark producing attachment, such as a conventional spark plug mounted in the wall of the combustion chamber. The resulting explosion closes the flow check valves, thus preventing continuous combustion of fuel which is continuously injected into admixture with air in the mixing zone ahead of the primary combustion zone. The explosion forces the combustion gases outwardly through a transition cone and a tail pipe, exhausting to the atmosphere. Inertia effects of the gases in the tail pipe cause the portion of combustion gas remaining in the combustion zone to expand below the pressure of the surrounding atmosphere.

Pressure of the air which exceeds the reduced pressure within the combustion zone causes the flow check valves to open so as to allow the passage of another charge of air into the mixing zone and another charge of fuel-air mixture into the primary combustion zone. The fuel is thought to be ignited by heat from the hot combustion gases remaining in the combustion zone. The cycle comprising fuel-air injection, combustion and exhaust repeats itself with a frequency of from 30 to 400 cycles per second depending upon the size of unit, valve design, fuel, and other factors. Once started, the operation proceeds without necessity of ram air or operation of a spark producing attachment.

An object of the invention is to provide an improved means of insulating parts of pulse jet engines which are exposed to high temperature. Another object is to provide improved means for reducing failure of moving parts of pulse jet engines, which failure results from fatigue. Another object is to provide an improved method for operating pulse jet engines. Another object is to provide a pulse jet engine fuel which will give a maximum of thrust per unit of fuel consumed with the least possible deterioration of the pulse jet engine. Other and further objects and advantages will be apparent upon study of the accompanying discussion.

Figure 2:
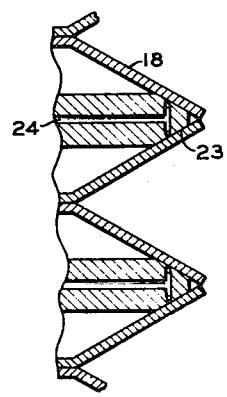

Better understanding of the invention will be obtained upon reference to the drawing in which Figure 1 is a schematic elevation of the forward portion of a pulse jet engine, partially in section. Figure 2 is a schematic elevation of a portion of a modified valve bank in section.

Referring particularly to the device shown in Figure 1 of the drawing, pulse jet engine 11 comprises shell 12 which encloses combustion chamber 13. Inlet cowling 14 is attached to the forward end of shell 12 and encloses cushioning material inlet header member 15. Conduit 16 extends between a cushioning material storage tank, not shown, and header member 15. Valves 17, which comprise valve blades 18 and valve seats 19, are positioned at the downstream end of inlet cowling 14. Fuel inlet header 21 is provided in the upstream end portion of combustion chamber 13 and is connected to a fuel storage chamber, not shown, by fuel conduit 22.

In Figure 2 of the drawing, valve blades 18 are seated on modified valve seats 23. Cushioning material inlet conduits 24 extend through valve seat members 23 to points adjacent the seating surface of valve blades 18.

In the operation of the device shown in Figures 1 and 2 of the drawing, fuel is introduced into the forward portion of combustion chamber 13 through fuel inlet header 21 and and is ignited in that chamber. The fuel expands during the rapid decomposition thereof and forces valve blades 18 against valve seats 19 to close the valves. The resulting combustion gas is rapidly exhausted through the downstream end of the pulse jet engine, lowering the pressure within combustion zone 13 so as to allow valves 17 to open and permit air to flow through inlet cowling 14, valves 17 and into combustion zone 13. An organic cushioning material is injected onto the surface of valve blades 18 during the operation of the engine. In the device shown as Figure 1 of the drawing, the cushioning material is introduced into the air stream and is injected thereby onto the valve blades. In the device shown as Figure 2 of the drawing, the cushioning material is injected onto the valve blades 18 from valve seat members 23 while the valves are in an open position. The cushioning material, being so injected onto the valve blades, forms a renewable cushion which absorbs a considerable amount of the shock normally absorbed by the valve blade upon contact with the valve seat.

From a consideration of the basic principles of operation of a pulse jet engine it is quite evident that the more rapid the rate of combustion the easier the engine will start. That result probably occurs because of the fact that an explosion of considerable violence must take place in order to create a low pressure area in the combustion chamber and thus start the series of pulsations necessary for engine operation.

In addition to the fact that it is desirable that the rate of combustion of the fuel should be explosive, we have discovered that best operating results are obtained when the fuel also has a high heat release. A high heat release will result in greater expansion of the combustion gas which results from the burning of the fuel. A greater intensity of shock wave is thus obtained by increasing the volume of combustion gas which is exhausted from the combustion chamber and thus in turn increases the thrust effect of the escaping gas.

The high temperatures within a pulse jet engine resulting from a higher heat release of the fuel tend to reduce the operating life of flow check valves in the forward part of the engine. Another factor which enters into the reduction of valve life in the pulse jet engine is the fact that rapid contact between the valves and the valve seats results in impact fatigue of the valves. Broadly speaking, this invention pertains to a method of operating a pulse jet engine in such a manner as to provide a renewable cushion for the flow check valves of the engine.

We have discovered that hydrocarbons which are not generally used as fuels for reciprocating combustion engines may be used with excellent effect as a base fuel in the operation of pulse jet engines. Normal paraffins boiling in the range of between 90° F. and 500° F. furnish those characteristics of high heat release found to be so desirable in pulse jet fuels. It is preferred to use those normal paraffins as a pulse jet fuel which boil in the range of between 150° F. and 350° F. Normal paraffins boiling between 350° F. and 500° F. may be satisfactorily utilized as pulse jet fuels by properly atomizing the fuel before its injection into the primary combustion zone for burning. A fuel comprising a hydrocarbon stock containing normal paraffins boiling in the range of from 150° F. to 500° F. is advantageous in that its use results in longer valve life in the pulse jet engine than does the use of a normal paraffin fuel boiling below 150° F. A fuel comprising normal paraffins boiling between 20° F. and 150° F. has better starting characteristics than does a fuel comprising normal paraffins boiling within the range of between 150° F. and 500° F. Many of the advantages of the lower boiling fuel can be secured by mixing a portion of the normal paraffins boiling between 20° F. and 150° F. with normal paraffins boiling between 150° F. and 500° F. so as to comprise a hydrocarbon stock of a pulse jet engine fuel. Such a fuel has markedly better start-up characteristics than does a fuel comprising a hydrocarbon stock which excludes the lower boiling normal paraffins. We have found that while the starting characteristics of the mixed fuel are improved by the addition of the lower boiling normal paraffins the valve life of pulse jet engines operated on the fuel is substantially unaffected by the addition.

We have found that very efficient pulse jet engine operation may be obtained by operating such an engine on a fuel which comprises a hydrocarbon stock which contains at least 50 per cent by volume of normal paraffins boiling in the range of between 150° F. and 500° F. Addition of between 5 per cent and 20 per cent by volume normal paraffins boiling in the range of between 20° F. and 150° F. substantially shortens the time required to start up a pulse jet engine utilizing such a fuel. Utilization of a hydrocarbon stock containing between 50 per cent and 85 per cent by volume of normal paraffins boiling in the range of 150° F. and 350° F. is preferred to that of operation with the broader range fuel, while the most preferred fuel is a hydrocarbon stock which contains between 75 per cent and 85 per cent by volume normal paraffins boiling in the range of between 150° F. and 350° F. Improved starting characteristics are also provided for our preferred fuels by the addition of between 5 and 20 per cent by volume of normal paraffins boiling in the range of between 20° F. and 150° F.

On occasion, shortage of fuel storage space may somewhat limit the length of time over which continuous operation of a pulse jet engine may be maintained. Under such conditions, the desired length of time for operation of a pulse jet engine together with the shortage of fuel capacity space may outweigh a desire for the highest efficiency of operation, in the determination of a fuel mixture for a pulse jet engine. Aromatics or substituted aromatics boiling in the range of between 175° F. and 350° F. have a high heat release per unit volume. Inasmuch as it may be desirable to get the greatest economical amount of heat release from a limited fuel load it may be desirable to mix selected aromatics boiling within the above boiling range with normal paraffins boiling within the range of between 150° F. and 350° F. together with a smaller fraction of normal paraffins boiling within the range of between 20° F. and 150° F. A fuel which comprises a hydrocarbon stock containing at least 50 per cent by volume of normal paraffins boiling in the range of 150° F. and 350° F. or 150° and 500° F. and between 5 per cent and 20 per cent by volume of normal paraffins boiling in the range of 20° F. and 150° F. together with 10 per cent to 45 per cent by volume aromatics boiling within the range of 175° F. to 350° F. provides a high ratio of heat release for a relatively small volume of fuel and one which has excellent start-up characteristics.

Specific normal paraffins which may be utilized for at least 50 per cent by volume of a hydrocarbon stock of a pulse jet engine fuel may include normal hexane, normal heptane, normal octane and normal decane. Normal paraffins which may be utilized to make up the 5 to 20 per cent normal paraffins of a hydrocarbon stock of a pulse jet engine fuel may be butane and/or pentane. Aromatics such as benzene and toluene and/or substituted aromatics, such as cumene, may make up the 10 to 45 per cent aromatic portion of the fuel volume.

It is preferred that the composite pulse jet fuel contain substantially no isoparaffinic material. In view of the fact that it is practically impossible to eliminate all isoparaffins in commercial distillation systems, it will usually be found necessary, however, to tolerate up to about 10 per cent by volume of isoparaffins in the finished fuel. Other non-deleterious materials may also go to make up a portion of the finished fuel. Some materials which may be utilized with our preferred fuel are nitro-paraffins, nitro-aromatics, ketones, ethers and alcohols. Such materials may make up as much as 30 per cent by volume of the finished material. It is, however, preferred to limit those materials to an amount not exceeding 10 per cent by volume of the finished fuel.

The practical use of pulse jet engines is considerably reduced by the short length of life of the flow check valves of the engine. There seem to be two primary causes for such a reduction in valve life. As pointed out above, those causes seem to be the exposure of valves to high temperatures, and fatigue resulting from rapid contact between valve and valve seat. We have discovered a method of operation by which it is possible to substantially increase the normal valve life of such an engine. It is not known exactly how the new method operates to improve the length of valve life. It is probable, however, that the benefit is due at least in part to a cushioning action of a material which is injected onto the surface of the valve blades. Such cushioning action would tend to reduce impact fatigue failure of the valves. It is further believed that the cushioning material also performs the function of insulating the valve members against the high temperatures within the pulse jet engine.

We have discovered that the valve blades may be continuously or intermittently coated with a coating material which substantially increases the valve life during operation of a pulse jet engine. The coating material comprises a relatively heavy or high boiling organic material which may or may not be dissolved in a solvent or carrier material. The organic material which may be added comprises compounds consisting of carbon and hydrogen or carbon and hydrogen together with one or more of the elements selected from a group consisting of oxygen, nitrogen, silicon, and sulfur. The coating material of our invention may be dissolved in the jet engine fuel. In some pulse jet engines the fuel injection point is spaced downstream from the flow check valves such a distance that the fuel does not come into contact with the valve blades. In that type of operation we have found that the life of the flow check valves may be materially extended by separately injecting the coating material into the air stream ahead of the flow check valves so that the coating material is carried onto the surface of the flow check valves continuously during operation of the pulse jet engine. Another method which may be utilized is to intermittently inject the coating material onto the surface of the valve blades from points adjacent the valve blades.

The organic materials which may be utilized for the purpose of this invention must meet the following specifications: a boiling point above 400° F., a minimum solubility of 0.01 per cent by volume in normal heptane at 0° F., and a maximum Conradson carbon of 1 per cent by weight. The organic materials may be dissolved in the base fuel in an amount ranging from 0.01 percent to about 5 percent by volume of the finished fuel. It is preferred to limit the amount of organic material to a range of between about 0.1 percent and about 1 percent, by volume. Though the maximum Conradson carbon should not be above 1 percent, it is preferred that the Conradson carbon be limited to a range between about 0 and about 0.05 percent. Materials which will meet the preferred carbon specification include light hydrocarbon fractions, such as kerosene, gas-oils, white mineral oil, heavy alkylate, olefinic polymers, polyorganosiloxanes, esters of di-basic acids, acrylic acid polymers, triethanolamine, ethylene oxide polymers. Examples of olefinic polymers include polyethylene, polypropylene, and polyisobutylene. Heavy alkylates include heavy alkylate fractions produced in well known alkylation processes, such as olefin-paraffin alkylation, as well as the still heavier alkylates known as synthetic lubricants which comprise products formed by the catalytic condensation of ethylene with such materials as naphthalene, tetralin, and other coal tar fractions. Polyorganosiloxanes, such as methyl silicone oil may be utilized. Esters of di-basic acids include the esters of adipic acid, known as hexanedioic acid, or the adipates and the esters of sebacic acid such as 2-ethylhexyl-sebacate. It is also possible to use hydrogenated diolefinic polymers such as hydrogenated polybutadiene. Another possible source of additive is sulfurized olefinic polymer. Still another source of additive is phosphate esters, such as tricresylphosphate.

If it is desired to utilize one of the coating materials which is not normally liquid, that coating material may be dissolved in a portion of the fuel which may be injected through the valves, or the heavier material may be carried by one of the normally liquid coating materials enumerated above. The above named coating materials may be utilized either singly or in combination with one another.

The organic materials do not perform the function of lubricants in the pulse jet fuel. Pulse jet engines have no bearings or other close fitting, moving parts, as do reciprocating internal combustion engines which require a coating or protective covering of lubricant to reduce friction and resulting wear therebetween.

The organic materials form a coating over the pulse jet engine parts which appears to provide a sufficiently thick cushion on the valve seats and blades that it breaks the shock of their contact together. Another function of the coating appears to be the heat insulation of engine parts. The exact reaction of the added organic material within the engine is not known. It is known, however, that substantially no deleterious residue, such as carbon, gum, or varnish, resulting from the organic material is found in the pulse jet engine after operation. Neither is there any excessive accumulation of the additive within the engine. It is possible that any quantity of organic material which is in excess of that necessary to coat or cushion the valves is carried into the primary combustion zone by the air flow. That effect may be intensified by the high frequency vibrations of the valves. Another possibility is that there may be a certain amount of vaporization of organic material from the heated surface of the jet engine.

Pulse jet engines are operated with the greatest efficiency when the fuels discussed hereinbefore are supplied to a given engine at fuel-air ratios by weight ranging between .01 and .08. It is within the scope of this invention to operate a pulse jet engine with our preferred fuel mixed with oxygen. If oxygen or an oxygen-supplying compound, such as a peroxide, is used rather than another oxygen-supplying gas, such as air, the fuel-air ratios would necessarily have to be adjusted accordingly so as to maintain a fuel-oxygen ratio equivalent to the fuel-air ratio disclosed herein. It is preferred to operate a pulse jet engine by supplying the fuel to such an engine at a fuel-air ratio by weight ranging between .03 and .07. Much difficulty is encountered in attempting to measure the exact amount of air actually supplied to a pulse jet engine because of the fact that up to about 30 per cent by volume of air may enter the combustion zone through the engine tail pipe or exhaust zone. A given pulse jet engine may be operated in a range of between 30 and 400 cycles per second, depending upon the size of the engine. Progressively larger engines operate at progressively lower cycle rates. By the term "cycle" we mean to include the steps of introducing the fuel-air charge into a primary combustion zone and igniting the fuel charge so as to produce an explosion which in turn produces a shock wave. The shock wave closes the flow check valves ahead of the flame front, thus preventing the flame from following the fuel-air mixture into the mixing zone, and carries a portion of the combustion gas out of the combustion zone through an exhaust zone from which it is exhausted to the surrounding atmosphere. Inertia of the combustion gas passing from the combustion zone causes a decrease in pressure in the gas remaining within the combustion zone to a pressure below that of the surrounding atmosphere. Pressure of the surrounding atmosphere which is greater than the reduced pressure in the combustion zone causes the flow check valves to open, thus permitting another charge of fuel-air mixture to flow into the primary combustion zone and thus start another cycle. The fuel-air mixture is thought to be ignited by heat from the combustion gas remaining in the combustion zone though there are other theories as to just what causes the fuel charge to ignite. Another cycle of operation of the engine is thus begun.

As has been pointed out above, it is highly desirable to get the greatest possible heat release from a given pulse jet engine without substantially shortening the valve life of the engine. Operation of pulse jet engines at the above mentioned conditions will result in a "temperature rise" in the engine which may range from about 800° F. to about 4500° F. By "temperature rise" we mean that rise of temperature taken between the inlet end of the engine and ranging to the highest temperature of the gas passing from the engine tail pipe or exhaust zone.

Advantages of using the above described fuel in the operation of a pulse jet engine will be obvious upon study of the following specific examples. Fuel proportions used in these specific examples are merely exemplary and should not be construed to unduly limit the invention.

SPECIFIC EXAMPLES

A 10 per cent blend of normal pentane in normal heptane was found to be a suitable pulse jet engine fuel. The addition of a kerosene fraction having a 521° F. ASTM distillation end point (99 per cent recovery, 0.5 per cent residue) extended the operating life of the valve elements. Results of tests with the above named materials are disclosed below in Table I. The tests were conducted on a thrust stand using a representative pulse jet engine.

TABLE I

*Effect of the additive of kerosene on the effective valve blade life*

| | Fuel | Maximum Thrust, Lbs. | Fuel Flow For Max. Thrust, Lbs./Hr. | Specific Fuel Consumption, Lbs. Lb. Thrust—Hr. | Relative Valve Blade Life |
|---|---|---|---|---|---|
| 1 | 10% Normal Pentane in Normal Heptane | 2.95 | 9.50 | 0.322 | 125 |
| 2 | 10% Normal Pentane and 10% Kerosene¹ in Normal Heptane | 2.90 | 9.95 | 0.344 | 175 |
| 3 | 25% Normal Pentane and 25% Normal Heptane in Kerosene¹ | 2.80 | 9.70 | 0.347 | 300 |

¹ Small amount of oily residue coating the valve blades and entrance duct was observed at all times during the test period.

The loss in efficiency experienced with the addition of large quantities of kerosene is assumed to result from the poor combustion characteristics of the major portion of the kerosene. The extended operating life of the valve elements is thought to result from the valve blade protecting characteristics of the small portion of relatively nonvolatile hydrocarbon components boiling above 400° F., in the kerosene.

Minor proportions (between 0.01 and 5 per cent by volume) of white mineral oil were added to the fuel, a portion of which was tested and recorded as (1) in Table I above. The mineral oil used had an approximate distillation range of from 800° F. to 1000° F. Tests were conducted on a thrust stand using a representative pulse jet engine. Results of the tests are recorded below in Table II.

*Table II*

*Effect of the addition of white mineral oil on the effective valve blade life*

| | Fuel | Maximum Thrust, Lbs. | Fuel Flow For Max. Thrust, Lbs./Hr. | Specific Fuel Consumption, Lbs. Lb. Thrust—Hr. | Relative Valve Blade Life |
|---|---|---|---|---|---|
| 1 | 10% Normal Pentane in Normal Heptane Plus 0.25% White Mineral Oil. | 2.97 | 9.60 | 0.323 | Greater than 800. |
| 2 | 10% Normal Pentane in Normal Heptane Plus 1.00% White Mineral Oil. | 2.94 | 9.30 | 0.316 | 500. |

Comparison of the results recorded in Tables I and II will show the tremendous increase in valve life accomplished by the operation of a pulse jet engine with a fuel falling within our preferred classification disclosed above and containing a dissolved amount of additive falling within our preferred additive content range.

The above described tests were carried on in a pulse jet engine in which the fuel injection was made at a point relatively close to the valve blade. For that reason the coating material contained in the jet engine fuel was caused to coat the valve blades, thus materially extending the life of the blades, as pointed out above. In those engines in which the fuel injection is made at points spaced a considerable distance downstream of the flow check valves, the coating material may be injected onto the valve blades separately or in a small additional portion of the fuel material from points upstream or at points relatively adjacent the flow check valves.

Though we have used the term "dissolve" or "dissolving" throughout the specification and claims, we mean to include by that terminology both true solutions and stable mixtures, such as a colloidal solution.

As will be evident to those skilled in the art, various modifications of the invention can be made or followed in the light of the foregoing disclosure and discussion without departing from the spirit or scope of the disclosure.

We claim:

1. An improved method for operating a pulse jet engine which comprises the steps of mixing a fuel comprising a hydrocarbon stock containing at least 50 per cent by volume normal paraffins boiling in the range of between 150° F. and 500° F. with air in a fuel-air ratio between .01 and .08; injecting a portion of said mixture into the forward portion of a primary combustion zone of fixed size; igniting said fuel mixture, whereby a shock wave is produced by the resulting explosion; exhausting the resulting combustion gas to an exhaust zone; repeating the cycle of fuel injection, combustion, and exhaust at a rate of between 30 and 400 cycles per second so as to produce a temperature rise in said engine ranging between 800° F. and 4500° F.; and during the operation of said engine, injecting an organic material boiling above 400° F., having a minimum solubility of .01 per cent by volume in normal heptane at 0° F., and having a maximum Conradson carbon of not more than 1 per cent by weight onto the flow check values of said engine.

2. The method of claim 1 wherein said organic material is intermittently injected onto said flow check valves from points adjacent the valve blades of said valves.

3. The method of claim 1 wherein said organic material is continuously injected onto said valves by passing the organic material into the air stream upstream of said valves.

4. The method of claim 1 wherein said organic material is dissolved in a portion of said fuel and is injected onto said flow check valves.

5. An improved method for operating a pulse jet engine which comprises the steps of mixing the fuel, comprising a hydrocarbon stock containing between 50 per cent and 85 per cent by volume normal paraffins boiling in the range of 150° F. and 350° F. with between 10 per cent and 45 per cent by volume aromatics boiling between 175° F. and 350° F., wth air in a fuel-air ratio between .01 and .08; injecting a portion of said mixture into the forward portion of a primary combustion zone of fixed size; igniting said fuel mixture, whereby a shock wave is produced by the resulting explosion; exhausting resulting combustion gas through an exhaust zone; repeating the cycle of fuel-air injection, combustion, and exhaust at the rate of between 30 and 400 cycles per second so as to produce a temperature rise in said engine ranging between 800° F. and 4500° F.; and during operation of said engine, injecting onto the flow check valves of said engine an organic material boiling above 400° F. and having a minimum solubility of .01 per cent by volume in normal heptane at 0° F. and a maximum Conradson carbon of 1 per cent by weight.

6. The method of claim 1, wherein said hydrocarbon stock contains at least 50 per cent by volume normal paraffins boiling in the range of between 150° F. and 350° F. and between 5 per cent and 20 per cent by volume normal paraffins boiling in the range of between 20° F. and 150° F.; and injecting said fuel into said combustion zone at a fuel-air ratio between .03 and .07.

7. The method of claim 1, wherein said hydrocarbon stock contains between 5 per cent and 20 per cent by volume normal paraffins boiling in the range of between 20° F. and 150° F.

8. The method of claim 5, wherein said hydrocarbon stock contains at least 50 per cent by volume normal paraffins boiling in the range of between 150° F. and 350° F. and between 5 per cent and 20 per cent by volume normal paraffins boiling in the range of between 20° F. and 150° F.; and injecting said fuel into said combustion zone at a fuel-air ratio between .03 and .07.

9. The method of claim 5, wherein said hydrocarbon stock contains between 5 per cent and 20 per cent by volume normal paraffins boiling in the range of between 20° F. and 150° F.

10. In a method of operating a pulse jet engine having a combustion zone of fixed size which is constantly open at its rear end and which is so adapted at the forward portion as to allow the passage of fuel and air thereinto, wherein said fuel is intermittently ignited; the improvement which comprises supplying as the fuel for said engine, a fuel comprising a hydrocarbon stock containing at least 50 per cent by volume or normal paraffins boiling in the range of between 90° F. and 500° F. in a fuel-air ratio between .01 and .08, and during the operation of said engine, injecting a hydrocarbon material boiling above 400° F., having a minimum solubility of .01 per cent by volume of normal heptane at 0° F., and a maximum Conradson carbon of not more than 1 per cent by weight onto the flow check valves of said engine.

11. In a method of operating a pulse jet engine having a combustion zone of fixed size which is constantly open at its rear end and which is so adapted at the forward portion as to allow the passage of fuel and and thereinto, wherein said fuel is intermittently ignited at a rate of between 30 and 400 cycles per second; the improvement which comprises supplying as the fuel for said engine, a fuel comprising a hydrocarbon stock containing at least 50 per cent by volume normal paraffins boiling in the range of between 90° F. and 500° F. with between 10 per cent and 50 per cent by volume aromatics boiling between 175° F. and 350° F. in a fuel-air ratio between .01 and .08, and during the operation of said engine, injecting a hydrocarbon material boiling above 400° F., having a maximum solubility of .01 per cent by volume in normal heptane at 0° F., and a maximum Conradson carbon of 1 per cent by weight onto the flow-check valves of said engine.

12. The method of claim 10 wherein said hydrocarbon material is kerosene.

13. The method of claim 10 wherein said hydrocarbon material is a heavy alkylate.

14. The method of claim 10 wherein said hydrocarbon material is an olefinic polymer.

SYLVESTER C. BRITTON.
ROBERT M. SCHIRMER.

REFERENCES CITED

The following references are of record in the file of this patent:

UNITED STATES PATENTS

| Number | Name | Date |
| --- | --- | --- |
| 2,142,601 | Bleecker | Jan. 3, 1939 |
| 2,396,566 | Goddard | Mar. 12, 1946 |

FOREIGN PATENTS

| Number | Country | Date |
| --- | --- | --- |
| 386,908 | Great Britain | Jan. 26, 1933 |
| 522,935 | Great Britain | July 1, 1940 |

Certificate of Correction

Patent No. 2,563,305                                                        August 7, 1951

SYLVESTER C. BRITTON ET AL.

It is hereby certified that error appears in the printed specification of the above numbered patent requiring correction as follows:

Column 10, line 33, for "wth" read *with*; column 11, line 6, for "volume or" read *volume of*; line 20, for "and", second occurrence, read *air*; and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*